US 6,641,499 B1

(12) United States Patent
Willmot (10) Patent No.: US 6,641,499 B1
(45) Date of Patent: Nov. 4, 2003

(54) TRANSMISSION

(75) Inventor: Eric Paul Willmot, Melba (AU)

(73) Assignee: Aimbridge Pty Ltd., Melbourne Victoria (AU)

( * ) Notice: Subject to any disclaimer, the term of this patent is extended or adjusted under 35 U.S.C. 154(b) by 0 days.

(21) Appl. No.: 09/979,941

(22) PCT Filed: May 26, 2000

(86) PCT No.: PCT/AU00/00603

§ 371 (c)(1),
(2), (4) Date: Nov. 26, 2001

(87) PCT Pub. No.: WO00/77420

PCT Pub. Date: Dec. 21, 2000

(30) Foreign Application Priority Data

Jun. 10, 1999 (AU) .......................................... PQ 0897

(51) Int. Cl.[7] ................................................ F16H 3/70
(52) U.S. Cl. ..................... 475/172; 475/173; 475/181; 475/186
(58) Field of Search ................................. 475/170, 172, 475/173, 175, 181, 185, 186, 187, 188

(56) References Cited

U.S. PATENT DOCUMENTS

| | | | | |
|---|---|---|---|---|
| 2,917,940 | A | * 12/1959 | Voreaux ..................... | 477/110 |
| 3,074,294 | A | * 1/1963 | Woolley ..................... | 475/170 |
| 3,589,211 | A | * 6/1971 | Douglas ..................... | 475/261 |
| 3,803,931 | A | * 4/1974 | Bianchini et al. ............. | 74/117 |
| 4,279,177 | A | * 7/1981 | Yamashita ..................... | 475/5 |
| 5,013,288 | A | * 5/1991 | Parsons ....................... | 475/166 |
| 5,081,877 | A | * 1/1992 | Mercat ......................... | 74/116 |
| 5,718,652 | A | * 2/1998 | Coronel ....................... | 475/169 |
| 2002/0139206 | A1 | * 10/2002 | Yang | |

FOREIGN PATENT DOCUMENTS

| | | |
|---|---|---|
| EP | 0 748 953 | 12/1996 |
| GB | 2 221 964 | 2/1990 |
| WO | WO 96/35892 | 11/1996 |
| WO | WO 98/50715 | 11/1998 |

OTHER PUBLICATIONS

S.V.Bombulevich, Derwent Abstract Accession No. 98–158135/14, RU 2086833C1, Aug. 10, 1997; Abstract and Figure.

Honda Motor Co. Ltd., Derwent Abstract Accession No. 97–063214, JP 08312737A, Nov. 26, 1996; Abstract and Figure.

Ranches Feedstuffs Equip Res Inst, Derwent Abstract Accession No. 92–240892/29, SU 1675602A, Sep. 7, 1991; Abstract and Figure.

Leyland Vehicles Ltd.: "Continuously Variable Transmission System" Derwent Publication Ltd, AU 36063/84B, Jun. 6, 1985, London, England.

* cited by examiner

Primary Examiner—Sherry Estremsky
Assistant Examiner—Tisha D. Lewis
(74) Attorney, Agent, or Firm—Fish & Richardson P.C.

(57) ABSTRACT

A transmission has a gear system (34) which may be in the form of an orbit system (32, 35) or a planetary orbital spur system. The gear systems include a control gear (32) which is controlled to determine the drive ratio of the transmission. The control gear is controlled by a momentum control which includes a disc (23) and a slide (25) which carries a magnet (30) for selectivity allowing or preventing rotation of the disc (23) to in turn change the speed of rotation of the control gear (32). Alternatively, the momentum control can be formed from moveable masses which move radially outwardly relative to the control shad to change the speed of rotation of the control gear.

4 Claims, 8 Drawing Sheets

TRANSMISSION

FIELD OF THE INVENTION

This invention relates to a transmission and in particular, to a continuously, variable transmission for varying an output drive ratio between a minimum and maximum value.

BACKGROUND OF THE INVENTION

Transmissions for vehicles and also used in most other environments generally have a single set gear ratio or the ability to select a number of gear ratios either automatically or by manipulation of a gear stick.

Continuously variable transmissions are also known and generally comprise belt systems in which the effective diameter of a pulley about which a belt is driven changes so as to change the gear ratio of the transmission. Other continuously variable transmissions include ridged body systems in which levers, pawls or gears are mounted on an eccentric and by changing the amount of eccentricity the drive ratio of the system can be altered between minimum and maximum ratios.

SUMMARY OF INVENTION

The object of the preset invention is to provide a improved transmission which has applications from heavy duty environments such as in vehicles to more refined environments such as transmitting power from relatively small electric motors.

The invention may be said to reside in a transmission, including;
- a gear system including an output gear for supplying output rotary power and a control gear for controlling a drive ratio of the gear system dependant on the speed of movement of the control gear; and
- momentum control means coupled to the control gear for transferring momentum to and from the control gear to change the speed of movement of the control gear to, in turn, change the drive ratio of the transmission.

The transmission according to this invention has applications in heavy duty environment such as vehicles and also in, some forms, in more refined environments such as electric motors.

In one embodiment the momentum control means is a momentum conversion means "loses" or dissipates the momentum from the control gear in order to change its speed, and thus loses energy from the system. In this embodiment of the invention the transmission includes a brake mechanism for slowing down or allowing speed up of the control gear so as to change its speed to, in turn, change the drive ratio of the transmission.

In one aspect of this embodiment the brake means can include an electromagnetic or magnetic brake which changes the speed of the control gear by magnetic or electromagnetic force.

This embodiment may include a fly wheel coupled to the control gear, the fly wheel forming a housing in which is located a magnetic fluid, a brake member in the housing, and a moveable magnet displaceable towards and away from the housing so as to cause the magnetic fluid to change its viscosity to apply a braking force to the fly wheel to change its speed.

In a second embodiment the momentum control is a momentum transformation means which is a substantially conservative momentum control. In this embodiment momentum is transformed from one state to another In this embodiment the momentum control includes a mass moveably coupled to the control gear for movement between first and second positions so as to change the moment of inertia of the mass and to, in turn, change the moment of inertia of the control gear to change the speed of the control gear as the mass moves between the first and second positions.

Preferably the control gear is coupled to a control shaft and the mass is mounted on the control shaft for radial movement with respect to the control shaft so that when rotary power is supplied to the transmission the control shaft is rotated and as the speed of rotation of the control shaft changes centrifugal force applied to the mass causes the mass to move radially outwards to change the moment of inertia so as to change the speed of the control shaft and, in turn, change the speed of the control gear.

In the first embodiment of the invention the gear system is most preferably an orbital gear system in which the output gear is an internally toothed gear and the control gear is an externally toothed gear, the control gear being mounted for orbital motion so as to transmit drive to the output gear.

In the second embodiment of the invention the system most preferably comprises a planetary orbital spur gear system.

Preferably the planetary orbital spur gear system includes;
- the output gear mounted on an output shaft;
- a planet cage;
- at least one spur cluster carried by the cage, the spur cluster having a first planet gear in mesh with the output gear, and a second planet gear fixed for rotation with the first planet gear; and
- an idler gear in mesh with the second plant gear and also in mesh with the control gear.

This arrangement has particular advantages in that the system is a fully external tooth gear system rather than requiring at least one gear with internal teeth as is the case with most planet systems, and the idler gear enables the rotation of the output gear and the control gear to occur in the same direction and also provides the ability to conveniently set the gear ratio of the system at a desired gear by simply selecting the appropriate teeth ratio between the output gear, the first planet gear, the second planet gear and the control gear. This is contrary to normal planet systems in which it is necessary to maintain the teeth ratio within very specific limits to ensure correct meshing of teeth thereby reducing the range of gear ratios which can generally be obtained and which are set in the planet gear system.

In a third embodiment of the of the invention the momentum control means includes;
- a fly wheel coupled to the control gear;
- a brake mechanism having movable brake arms carried by the gear system so that as the speed of rotation of the gear system increases the brake arms pivot under centrifugal force to engage the fly wheel and drag the fly wheel so as to change the speed of the control gear to in turn change the drive ratio of the transmission.

Preferably the control shaft in this embodiment of the invention also includes a ratchet ring for engaging a pawl so as to prevent backward rotation of the control shaft thereby placing the transmission into a low gear without allowing the control shaft to place the transmission into neutral gear.

The invention may also be said to reside in a planetary orbital spur gear system including;
- a planet cage;
- at least one spur cluster coupled to the planet cage and including a first planet gear and a second planet gear fixed for rotation with the first planet gear;

an output gear coupled to the first planet gear for supplying rotary power; and a control gear mounted for rotation relative to the output gear and coupled to the second planet gear for controlling the drive ratio of the system.

This arrangement has particular advantages because all of the gears in the system can be externally toothed gears and an internally toothed gear is not required.

Preferably the second planet gear is coupled to the control gear by an idler gear.

This arrangement provides additional advantages in that the gear ratio of the transmission can be initially set at a particular drive ratio when the planet cage and output gear rotate at the same speed by suitable selection of the tooth ratio between the control gear, the first planet, the second planet gear and the output gear. Thus, a wide range of gear ratio are available with the orbital spur system in contradistinction to normal planet systems in which the very limited range is possible.

Preferably the drive ratio of the transmission is altered between maximum and minimum limits by varying the speed of the control gear relative to the cage so as to control the spur cluster to, in turn, control the speed of the output gear.

Preferably the control gear is coupled to a control shaft and the system includes means coupled to the control shaft for controlling the speed of rotation of the control shaft and therefore the control gear to, in turn, control the drive ratio of the transmission.

A further aspect of the invention may be said to reside in a transmission, including;

a gear system including an output gear for supplying output rotary power and a control gear for controlling a drive ratio of the gear system dependent on the speed of movement of the control gear; and magnetic or electromagnetic brake means for controlling the speed of rotation of the control gear to, in turn, set the drive ratio of the transmission.

This aspect of the invention has particular advantages in that the magnetic or electromagnetic brake will not fade. Thus if the transmission is to be set at a particular drive ratio for lengthy periods of time in which the brake is required to control the speed of the control gear to a particular rotational speed then the brake system will not fade and the gear ratio can be controlled accurately over that lengthy period of time. If mechanical brake systems employing a frictional surface are used then the frictional contact between components of the mechanical brake system will wear causing a slight fading of the brake and therefore of the braking force applied to control gear. Thus the speed of control gear can change slightly notwithstanding the application of the brake which can change the drive the ratio from the required over a length period of time.

BRIEF DESCRIPTION OF THE DRAWINGS

Preferred embodiments of the invention will be described, by way of example, with reference to the accompanying drawings in which.

DETAILED DESCRIPTION OF THE DRAWINGS

Figure 1:
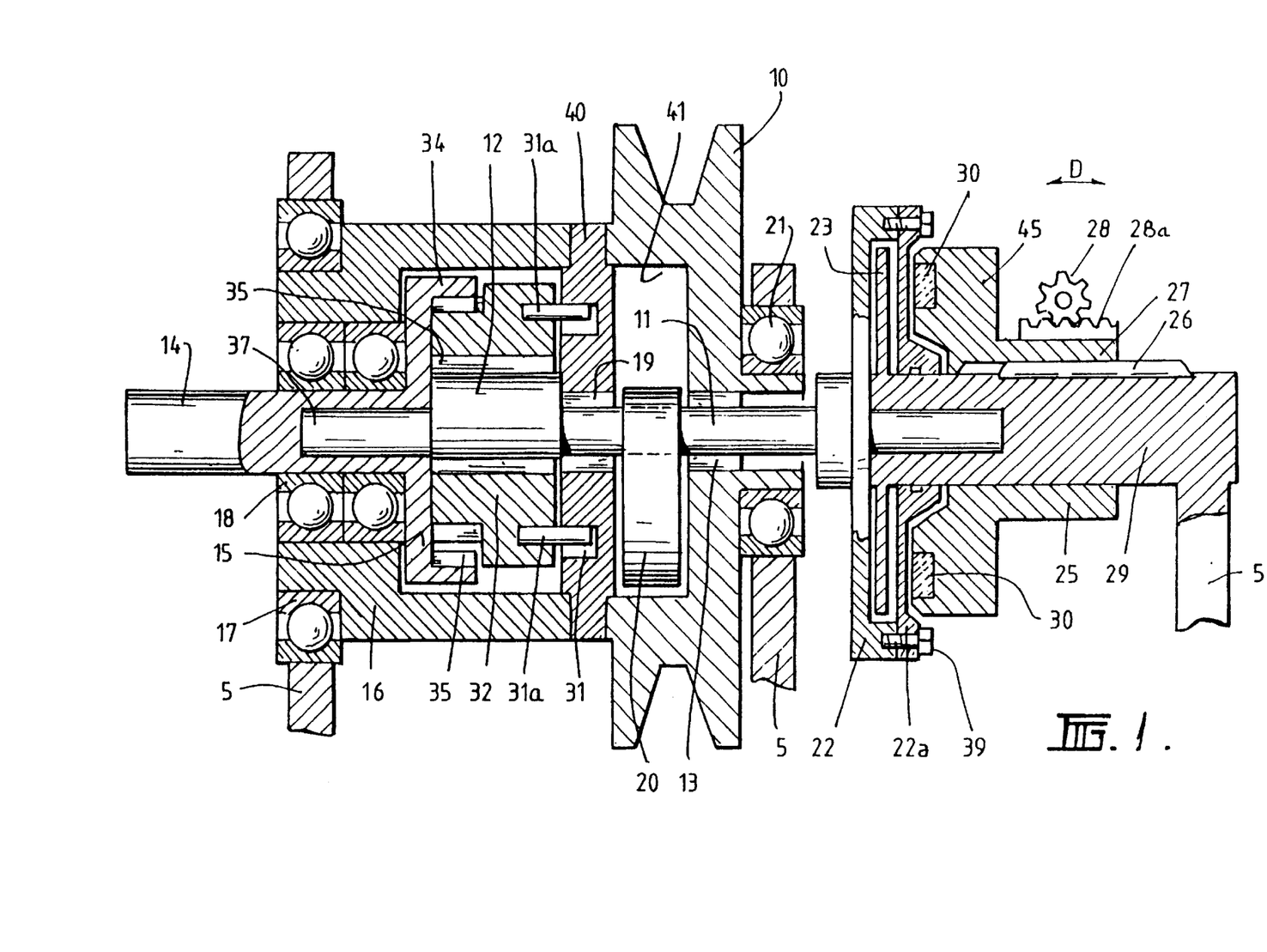
FIG. 1 is a cross-sectional view of a transmission according to the first embodiment of the invention.
Figure 2:
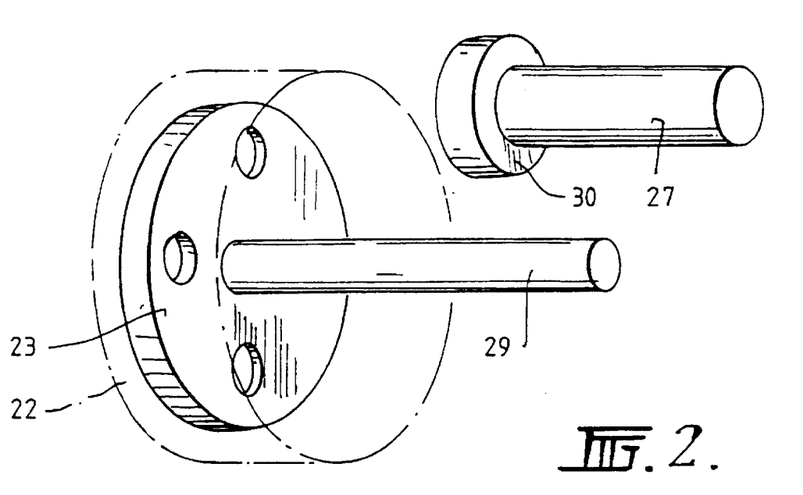
FIG. 2 is a diagram to assist explanation of the embodiment of FIG. 1.

FIGS. 1 and 2 show a first embodiment of the invention which is particularly suited for use with electric motors. The transmission of FIG. 1 has an input pulley 10 which is mounted for rotation on a control shaft 11 via a bearing 13. The control shaft 11 has an eccentric 12 and an end 37.

The pulley 10 is connected to an orbit control plate 40 which is fixed to outer casing or cage 16. The casing or cage 16 and control plate 40 are able to rotate on control shaft 11 via bearings 19. An output shaft 14 is journaled on the end 37 of the control shaft 11 for rotation relative to the control shaft and carries an output gear 15. The output gear 15 has a gear ring 34 with internal teeth 35. An orbit gear 32 is mounted on the eccentric 12 via bearing 35. The orbit gear 32 has external teeth 33 for mesh engagement with the teeth 35 of the output gear 15.

The orbit gear 32 also has projecting pins 31 which locate in circular holes 30 provided in the orbit control plate 40. In the drawing of FIG. 1 two sets of pins 31 and holes 30 are provided. However, usually about four such sets would be provided with the sets being spaced apart at about 90°.

The pulley 10 has an internal cavity 41 and a counterweight 20 is mounted on the shaft 11 within the cavity 41 for balancing the eccentric 12 and orbit gear 32.

The control shaft 11 carries an integral housing 22 which is closed by a plate 22a. The plate 22a is coupled to the housing 22 by bolts 39. The control shaft 11 has an end 38. Casing or stand 5 in which the transmission is mounted has, (at the right hand end of the casing 5) a fixed shaft 29 in which end 38 of the control shaft 11 is journaled. The fixed shaft 29 carries a fixed disk 23 which is arranged within the housing 22. The housing 22 is filled with a magnetic fluid (such as ferrite powder in hydraulic fluid) so that when the control shaft 11 rotates the housing 22 rotates relative to the fixed disk 23. The housing 22 therefore affectively forms a fly wheel for the transmission.

Mounted on the shaft 29 is a cylindrical slide 25 which carries a rack 29. The slide 25 has an end plate 45 which supports magnets 30. A gear wheel 28 is in engagement with the rack 29 and the gear wheel 28 is rotatable so as to drive the rack and therefore the slide 25 in the direction of double headed arrow D in FIG. 1. A keyway 26 is provided on the shaft 29 and the cylindrical slide 25 engages the keyway so that the cylindrical slide 25 cannot rotate but merely slide back and forward in the direction of double headed arrow D on the keyway 26.

When input rotary power is supplied to the pulley 10 via a belt (not shown) the pulley 10 is rotated to, in turn, rotate the orbit control plate 40 and the outer casing or cage 16. Rotation of the control plate 40 causes the orbit gear 32 to execute an orbit on the eccentric 32 with the orbital motion of the orbit gear 32 being controlled by the pins 31 which are received in the circular holes 30 so that the gear 32 cannot merely rotate with the plate 40 but must execute a stationary orbit relative to the output gear 15. The orbital control of the orbit gear 32 and the gear teeth profiles of the teeth 33 and 35 are more fully described in our co-pending International application no. PCT/AU97/00443 (the contents of which are incorporated in this specification by this reference).

The orbital motion of the orbit gear 32 causes the eccentric 12 and therefor the control shaft 11 to rotate, which in turn rotates the housing 22 relative to the fixed disk 23.

When no load is applied to the control shaft 11, the control shaft 11 will rotate rapidly with virtually no output power at all being supplied to the output shaft 14 from the gear 33 to the gear 15. Thus, the transmission is initially in neutral with all the rotation of the input pulley 10 being affectively transmitted to the eccentric 12 and therefore the control shaft 11. In order to in increase the drive ratio, the gear wheel 28 is rotated to cause the cylindrical slide 27 to move into a position close to the housing 22. The magnets 30 and the magnetic field they produce causes the magnet fluid within the housing 22 to increase in viscosity (so called effectively freezing) so as to slow down the rotation of the housing 22 relative to the disk 23 in view of the increased viscosity of the fluid within the housing 22. Thus, a breaking force is effectively applied to the housing 22 by in the increase in viscosity of the fluid thereby changing the angular momentum of the housing 22 and the shaft 11. The slowing down of the control shaft 11 causes the eccentric 12 on which the orbit gear 32 is to rotate to in turn change its rotational speed and resalts in the orbit gear 32 driving the output gear 15 to in turn supply output drive to the shaft 14. The drive ratio of the transmission can be changed by the control of the control shaft 11, which in turn, is controlled by the cylindrical slide 29. The closer the slide 29 is to the housing 22 the greater the degree of freezing of the magnetic fluid within the housing 22 and therefore the greater the breaking affect and the more the control shaft 11 is slowed down. Thus, the drive ratio of the transmission can be continuously varied from neutral up to and towards the ratio of 1:1 where the control shaft 11 is effectively stoped.

The fly wheel 22 and the breaking action caused by the disk 23 and the fluid within the housing 22 effectively changes the momentum of the rotating shaft 11. In this embodiment of the invention the change in momentum produces a result of loss of energy caused by the breaking action. However, the amount of energy supplied through the shaft 11 is relatively small so the loss of energy which occurs as the shaft 11 is retarded is also relatively small.

FIG. 2 is a schematic diagram showing the housing 22, the disk 23 and the magnet 30 in schematic form. As a magnet 30 moves towards the disk 22 the magnetic field causes a change in the magnet fluid within the housing 22 which will increase the viscosity of the fluid so as to make it more difficult for the housing 22 to rotate relative to the stationary disk 23. In other arrangements, a mechanical brake could be applied for providing a mechanic breaking force to the fly wheel 22. However, the magnetic or, possibly an electromagnetic braking mechanism has the advantage of not fading over time if it is desired to set a particular drive ratio for the transmission which must be held for a lengthy period of time. If a mechanical brake is used the friction caused in the mechanical braking components can cause a slight fading of the braking force which may enable the speed of the control shaft 11 to vary thereby changing the output drive ratio from the transmission. However, the magnetic braking force will hold with substantially no fade so as to enable the drive ratio of the transmission to be set and held for a lengthy period of time.

Figure 3:
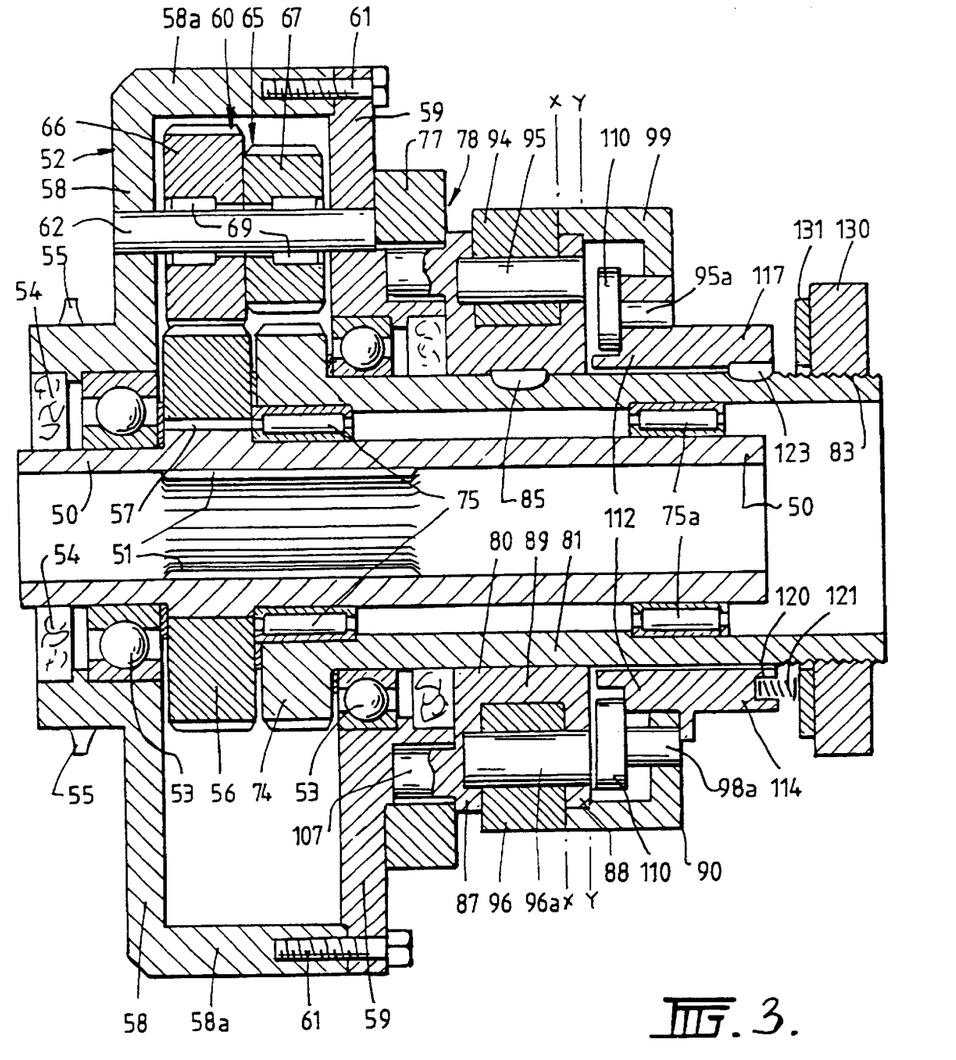
FIG. 3 is a cross-sectional view according to a transmission of the second embodiment of the invention.

With reference to FIG. 3 a second embodiment of the invention is shown. A hollow output shaft 50 is provided with internal splines 51 for mating with a drive shaft (not shown) to which output rotary power is to be supplied. The drive shaft may be the drive shaft of a vehicle. A planet cage 52 is mounted on the shaft 50 by bearings 53 and bushes 54 for rotation relative to the shaft 50. The planet cage 52 acts as the input for rotary power into the transmission and may be coupled to a crank shaft (not shown) of an internal combustion engine or carry sprocket teeth 55 for receiving a chain (not shown) from which rotary power can be supplied from a motor or the like. In the case of large internal combustion engines in conventional street vehicles power would be generally supplied from an internal combustion engine via a shaft coupled to the cage 52. However, in the case of other vehicles such as all terrain vehicles or small purpose vehicles drive may be supplied from a chain or belt which engages the sprocket 55. An output gear 56 is fixed relative to the shaft 50 by a keyway 57. or may be made integral with the output shaft 50.

Figure 4:
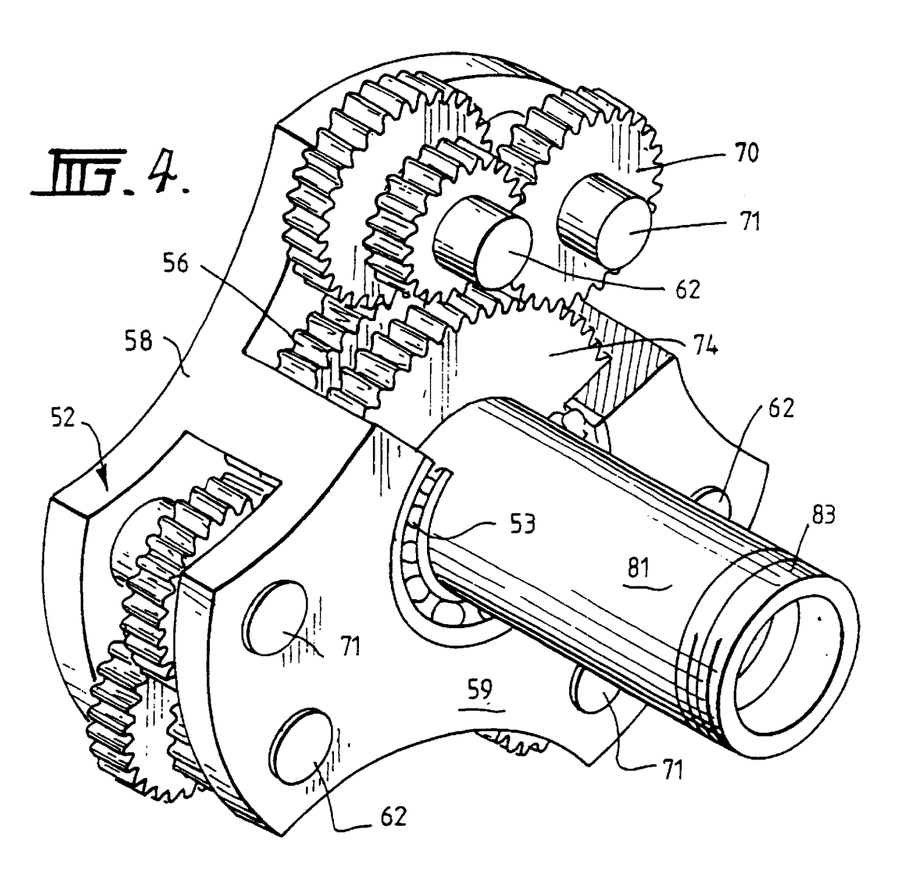
FIG. 4 is a perspective view of part of the transmission of FIG. 3.
Figure 5:
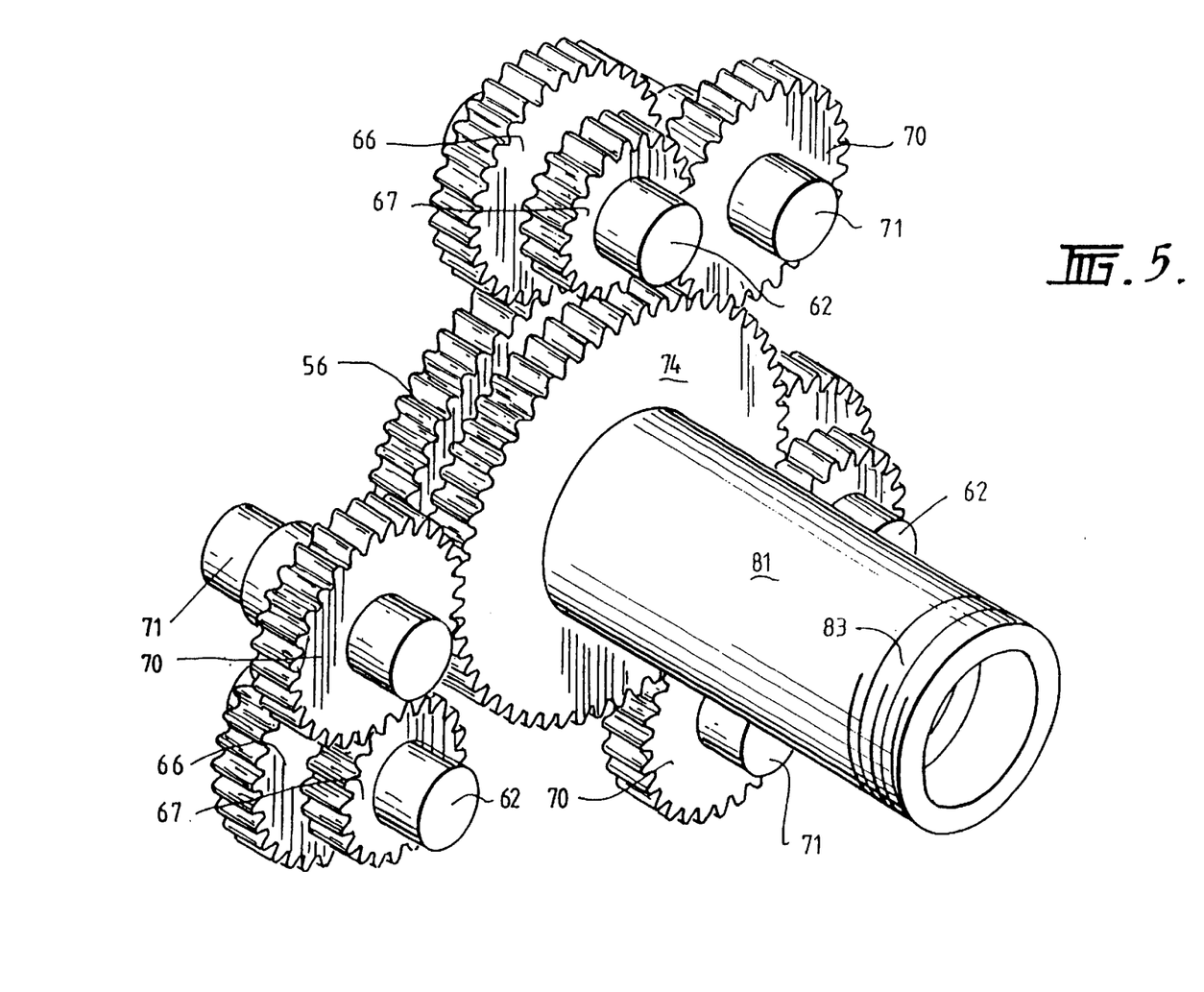
FIG. 5 is a view similar to FIG. 4 with some of the parts removed for additional clarity.
Figure 6:
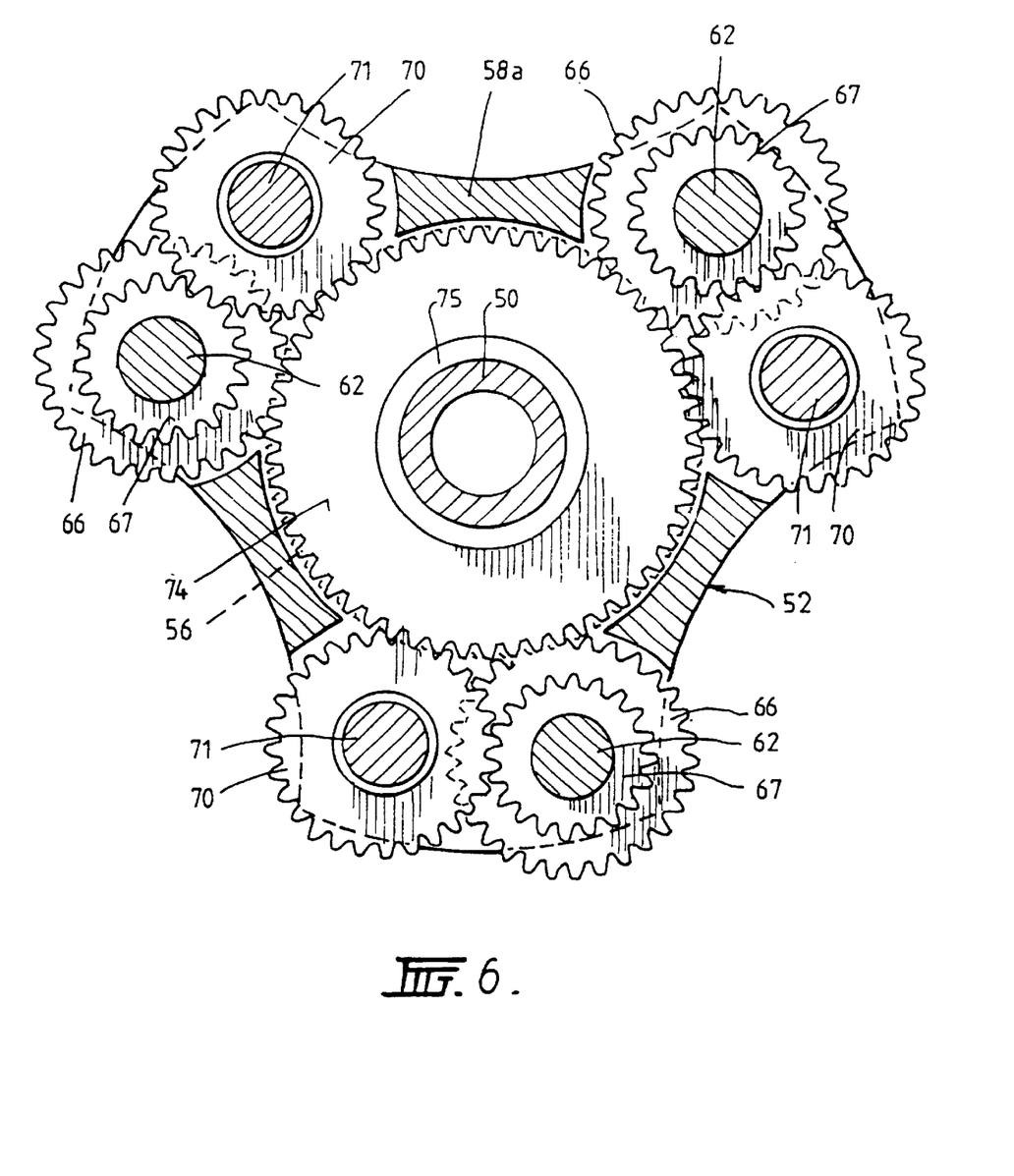
FIG. 6 is a cross-sectional view through the part shown in FIG. 3.
Figure 7:
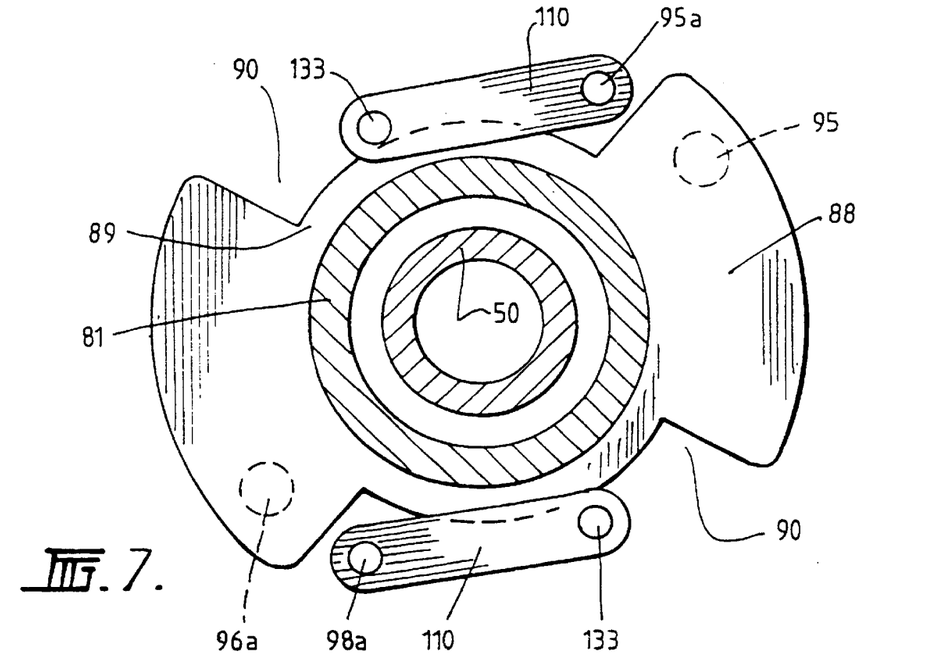
FIG. 7 is a cross-sectional along the line YY of FIG. 3.

The cage 52 forms a planet cage for an orbital spur transmission 60 which is shown in more detail in FIGS. 4, 5 and 6. The cage 52 has a plate 58 (including an integral cylindrical wall 58a) and a plate 59 which may be coupled together by bolts 61 and a plurality of shafts 62 are supported between the plates 58 and 59.

Each of the shafts 62 supports a spur cluster 65 which comprises a first planet gear 66 and a second planet gear 67. The planet gear 66 and the planet gear 67 are fixed for rotation with one another by either being made integral or by being connected together. Bearings 69 may be provided between the gears 66 and 67 and the shaft 62 to facilitate rotation of the gears 66 and 67 on the shaft 62.

The gear 66 is in meshing engagement with the output gear 56. Idler gears 70 are in meshing engagement with each of the second planet gears 67 and are supported on a second shaft 71 supported between the plates 58 and 59. The idler gear 70 is also in meshing engagement with a control gear 74 which is mounted on the output shaft 50 via bearing 75 so that the gear 74 can rotate relative to the output shaft 50 and also therefore relative to the output gear 56.

The plate 59 is provided with a first component 77 of a ratchet 78 which may be made in accordance with our co-pending International patent application no. PCT/AU98/00061, (the contents of which are incorporated into this specification by this reference).

Figure 10:
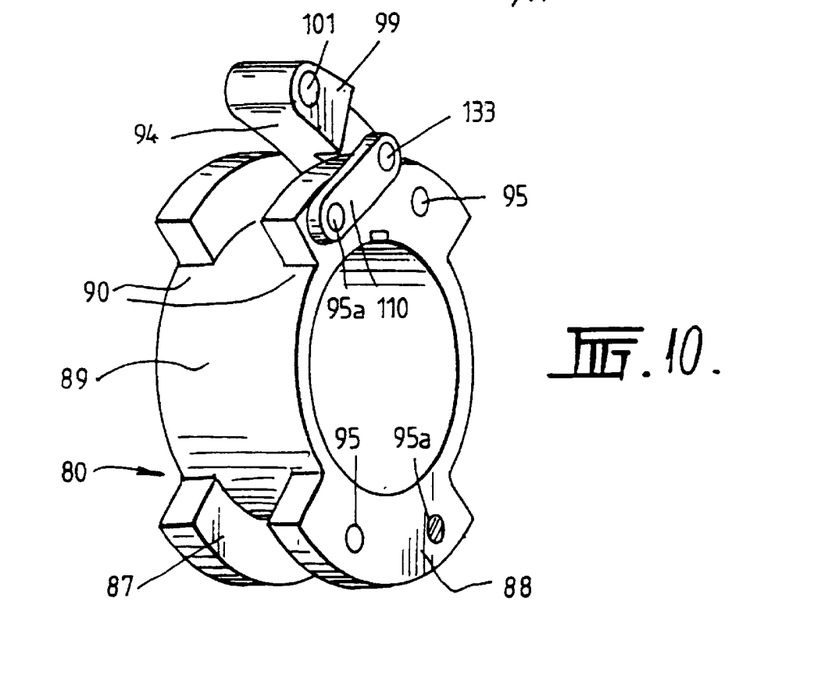
FIG. 10 is a perspective view of the part shown in cross-section in FIG. 7.

The control gear 74 has an integral control shaft 81 which is supported on, and for rotation, relative to the output shaft So on the bearings 75 and also on bearing 83. The control shaft 81 has a screw thread 83 at its free end remote from the control gear 74. A spool 80 is fixed to the control shaft 80 by a keyway 85 for rotation with the control shaft 81. The spool 80 is shown in perspective view in FIG. 10 and has spool plates 87 and 88 and central cylinder 89 which joins the spool plates 87 and 88. The spool plate 88 is provided with cut outs 90.

Figure 9:
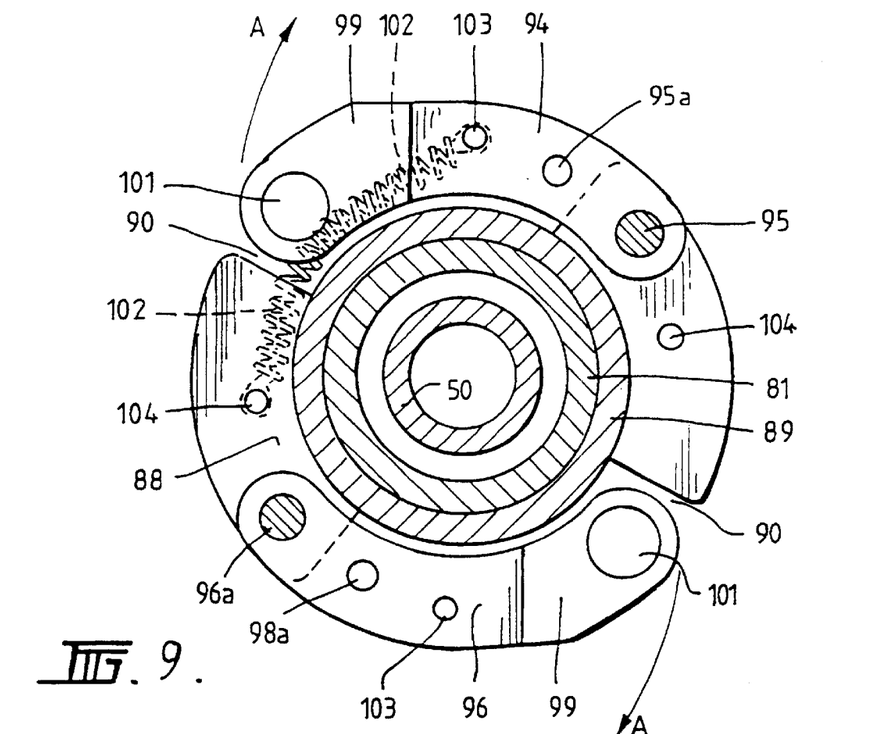
FIG. 9 is a cross-sectional view along the line X—X of FIG. 3.

Two diametrically opposed arms 94 and 96 are pivotally mounted between the spool plates 87 and 88 on pivot pins 95 and 96a. The arms, as shown in FIG. 9, are curved in cross-section and sit between the spool plates 87 and 88. However, each arm 94 and 96 has a laterally extending extension portion 99 (best show in FIG. 10) which straddles the plate 88 and which is accommodated by the cut out 90 in the plate 88 when the arms are in the fully closed position shown in FIG. 3 and FIG. 9. The lateral extension 99 of the arms 94 and 96 may include a bore 101 for receiving additional weight such as a lead mass or the like for increasing the weight of the arms 94 and 96. A spring 102 is connected to the arms 94 and 96 (only one spring being shown in FIG. 9) for biasing the arms 94, 96 into the fully closed position shown in FIGS. 3 and 9. The spring 102 is fixed on a pin 103 carried by the arms 94 and 96 and a pin 104 on the plate 87 or 88.

A second component 107 of the ratchet 78 is fixed onto the spool plate 87 and cooperates with the component 77 fixed to the cage plate 59 to form a ratchet between the planet cage 52 and the spool 80 and therefore the control shaft 81 and control gear 74.

A lever 110 is pivotally mounted onto each of the arms 94 and 96 by pivot pins 95a and 98a. The other end of the lever 110 is pivotally coupled to a cylindrical cam carrier 112 via pivot pins 133 (best shown in FIG. 8). The cam carrier 112 has a reduced diameter skirt portion 114 from which project two cam lobes 116. The cylindrical cam carrier 112 is mounted for rotation on the control shaft 81 under the influence of the levers 110 in the manner which will be described in more detail hereinafter.

Figure 8:
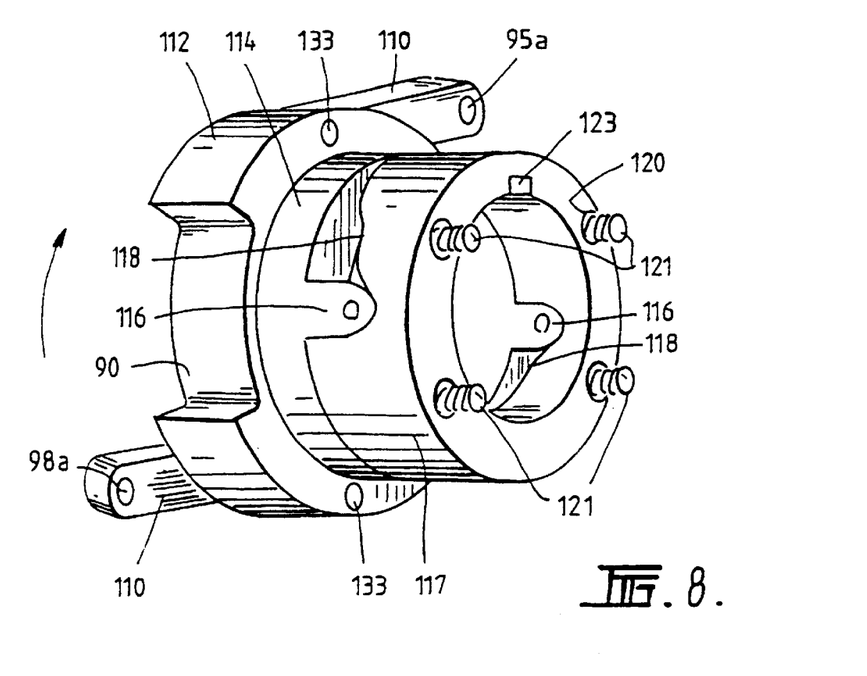
FIG. 8 is a perspective view of part of the embodiment of FIG. 3.

A cam ring 117 is keyed onto the control shaft 81 by keyway 123 and has two cam surfaces 118 with which the cams 116 engage and can ride upon as will be described in more detail hereinafter. The cam ring 117 is slidable on the shaft 81 but is prevented from rotating on the shaft 81 by the keyway 123.

The cam ring 117 has four holes 120 which receives springs 121 and a retainer 130 is screw threaded onto the screw thread 83 on the control shaft 81. The retainer 130 carries a ring 131 so that as the retainer 133 is screwed up onto the shaft 81 the springs are compressed and push the cam ring 117 firmly into engagement with cams 116.

Operation of the transmission shown in FIGS. 3 to 10 will now be described.

When input rotary power is supplied from a power supply such an internal combustion engine to the planet cage 52 the planet cage 52 rotates on bearings 53 relative to the output shaft 50. Rotation of the planet cage 52 will carry the spur clusters 65 and their respective idler gears 70 so that the first planet gears 66 rotate about shafts 62 in mesh with output gear 56. Rotation of the gears 66 also rotates the second planet gears 67 which supplies rotation to their respective idler gears 70 which are in mesh with the control gear 74.

The drive ratio of the orbital spur transmission is as follows;

output ratio (control shaft 81 stationary): $R_c = 1/\{1-(A/B \times C/D)\}$

Control ratio (output shaft 50 stationary: neutral):

$R_c = (-1)\{1/[1-(A/B \times C/D)]\}$ where

A is the number of teeth on gear 74
B is the number of teeth on gear 67
C is the number of teeth on gear 66
D is the number of teeth on gear 56

Assuming that the internal combustion engine is started and is merely idling at an idle speed of say 1000 rpm the output shaft 50 will be stationary because of the load applied to the output shaft 50 (i.e. by the vehicle being on a slight incline) or the driver simply locating his foot on the foot brake of the vehicle to stop the vehicle from creeping forward as is the case with a conventional automatic transmission. Since rotation is supplied to the cage. 52 and the output gear 56 is stationary rotation is supplied to the control gear 74 via the first and second planet gears 66 and 67 and their respective idler gears 70 so that the control gear 74 and the control shaft 81 are rotated at a speed set by the gear ratio between the first planet gear 66 and the control gear 74 in accordance with the above equation $R_c$. For example, the gear ratio may be such that at 1000 rpm rotation speed of the planet cage 52, the control gear 74 and control shaft 81 rotate at the speed of 2400 revolutions per minute.

When the control shaft 81 rotates, the spool 80 rotates with the control shaft 81 and the ratchet part 107 simply over runs the ratchet part 77. At a rotational speed of about 2400 rpm the springs 102 together with the lever 1100 and cams 116 maintain the arms 94 and 96 in the retracted position shown in FIGS. 1 and 9.

As the driver of the vehicle increases the speed of the vehicle by releasing the brake and depressing the accelerator, engine rpm increases so that the rotational speed of the cage 52 is increased. As the speed of rotation of the cage 52 increases the speed of rotation of the control gear 74 and therefore the control shaft 81 also increases. This increases the rotational speed of the spool 80 so that the centrifugal force commences to overcome the bias of the springs 102 and the arms 94 and 96 begin to swing outwardly (due to that centrifugal force) on pivot pins 95 and 96a as shown by arrows A in FIG. 9. At this stage the output shaft 50 begins to move because the gear ratio is extremely low at about 1000:1 because of the rotational speed of the control gear 74 relative to cage 52. As the arms 94 and 96 move out the moment of inertia 35 of the spool 80 effectively changes so that the speed of rotation of the control shaft 81 is reduced because of the change in the moment of inertia of the spool 89 due to the radial outward movement of the arms 94 and 96. The relative reduction in speed of the control shaft 81 with respect to the cage 52 is supplied to the integral control gear 74 which is in mesh with the idler gear 70 and are in turn in mesh with the second planet gear 67. Thus, as the speed of rotation of the control gear 74 decreases relative to the cage 52 the speed of rotation of the planet gears 66 and 67 changes so as to change the speed of rotation of the output gear 58 and therefore the output shaft 50. This change in speed causes an increase of the speed of the gear 56 and output shaft 50 so that the effective drive ratio of the transmission increases from the low gear of about 1000:1 up to an intermediate gear ratio so that the vehicles takes off and starts to increase speed as the accelerator pedal is depressed.

With increased depression of the accelerator the cage 52 is increased in its rotational speed which will be supplied through to the control shaft 81 causing the arms 94 and 96 to move further radially outwardly due to centrifugal force so that the drive ratio of the transmission will rapidly rise as the speed of the control shaft 81 and control gear 74 change (i.e. decrease relative to cage 52).

When the rotation of the control shaft 81 a nd therefore the spool 80 reach top speed the ratchet components 77 catches up to component 107 and he components 77 and 107 lock so that the cage 52 is effectively locked to the spool 89 so that the transmission effectively provides a gear ratio of 1:1.

It should be understood that because of the gear ratio set in the orbital spur transmission 60 the control shaft 81 and spool 80 always rotate at a speed greater than or equal to the speed of the cage 52. As the speed of rotation of the cage 52 increases the relative speed of the shaft 81 and the spool 80 decreases relative to the cage 52 because of the change of inertia caused by the outward movement of the arms 94 and 96. For example, at the speed of 1000 rpm previously mentioned the shaft 81 is rotating at a speed of 2400 rpm as is the spool 80. At a rotational speed of say 4000 rpm of the cage 52, if a change in the moment of inertia was not produced by the outward movement of the arms 94 and 96, the shaft 81 and spool 80 would simple rotate at the same ratio as set in the transmission 60 and therefore rotate at a speed of 9600 rpm. However, because the moment of inertia has changed by virtue of the outward movement of the arms the actual rotational speed is somewhat less than 9600 rpm say about 5000 rpm. Thus, the relative speed of the shaft 81 and therefore the gear 74 has dramatically decreased relative to the cage 52 and this is what causes the change in drive ratio from the cage 52 through to the output shaft 50. The change in speed of the control shaft 81 is affectively caused by a change in the moment of inertia of the output shaft 81 and spool 80 caused by the movement of the arms 94 and 96. At say the top speed of the internal combustion engine and therefore the top speed of the cage 52 of, for example 6000 rpm, the arms 94 and 96 have moved to their radially outer most position and the speed of the cage 52 has affectively caught up to the speed of rotation of the shaft 81 and spool 80 so that the ratchet component 77 no longer simple over runs the ratchet component 107 but rather locks with the component 107 so as to lock the cage 52 to the spool 80 and therefore produce a drive ratio of 1:1 between the cage 52 the spool 80 and therefore the control shaft 81. This prevents the cage 52 from ever rotating faster than the spool 80 because soon as the cage 52 catches up the spool 80 the ratchet 78 affectively locks so that the spool 80 is rotated at the same speed as the cage 52. The spool 80, as noted above, can rotate faster than the cage 52 by the ratchet component 107 simply over running the ratchet component 77.

If the motor slows down by the driver releasing or reducing the pressure on the accelerator pedal then the input speed of the cage 52 decreases as does the speed of rotation of the spool 80 so that the arms 94 and 96 will move inward due to the decrease in centrifugal force caused by the decreased rotational speed of the spool 80, and the shaft 81 will effectively increase in speed relative to cage 52 because of the change in moment of inertia as the arms 94 and 96 move radially inwardly. The increase in relative speed of the shaft 81 and the control gear 74 will change the speed of the planet gears 66 and 67 therefore causing the gear ratio of the transmission to drop towards a much lower gear.

Thus, an automatic transition which provides a continuously variable gear ratio between a minimum and maximum level is obtained by the transmission of FIGS. 3 to 10.

As the arms move outwardly the outward movement of the arms is controlled not only by the return bias provided by the springs 103 but also by the levers 110 and the cylindrical cam carrier 112 and the cam ring 117. As the arms 94 and 96 move outwardly they pull the levers 110 outwardly with them so that levers 110 rotate the cylindrical cam carrier 112 in the direction of arrow B in FIG. 8. This causes the cams 116 to ride up the cam surfaces 118 which have varying steepness along their length as shown in FIG. 8. The cam surface 118 from the position of the cam 116 shown in FIG. 8 is quite steep thereby providing a relatively slow increase in gear ratio from about 1000 revolutions per minute to 1200 revolutions per minute. The reason for this is that the arms 94 and 96 must drag the cam 116 up the steep incline against the bias of the springs 121 thereby pushing the cam ring 117 on its keyway 123 longitudinally along the shaft 81 against the resistance provided by the retainer 130. As the cam 116 rises up over the first steep portion of the cam surface 118 it reaches a much more gently incline portion and this provides greater ease of the arms 94 and 96 to move outwardly under centrifugal force and therefore provides a rapid increase in gear ratio form say 1200 rpm to 2500 rpm. The cam surface 118 then has a further rather steep incline so that a medium increase in gear ratio is provided from say 2500 rpm to 4000 rpm in view of the resistance to outward movement of the arms 74 and 76 provided by the cam 116 having to travel up the further steeper of the cam surface 118.

At maximum speed of the engine say 6000 rpm the engine is effectively run out of torque and at this speed the ratchet component 77 and 78 engage and lock so as to lock the cage 52 to the spool 80 and provide a gear ratio of 1:1 from the engine (not shown) to he output shaft 50 as previously described.

In this embodiment the transmission has at least three separate ways of providing rotating input or output (i.e. gear 52, output gear 56, control gear 74). One input/output is used for the input, one used for the output and the other is used as the control means (i.e. shaft 81). The control 81 is designed to be the input path, which utilises the least torque.

The scientific principle on which the transmission system works is that of conservation of angular momentum, and upon the definition of torque as the time rate of change of momentum.

Angular momentum is the rotational analogue of linear momentum and because of its relationship to torque, it is of fundamental importance to mechanical engineering and to the theory of machines.

Linear momentum is defined as;

$M = mv$

Where m is translational inertia (mass) and v is velocity. while angular momentum is $L = I = \omega$ Where I is moment of inertia and $\omega$ is angular velocity.

Linear momentum is always conversed and can only be changed by converting it to force by, for instance, a collision. Any such change must deal with the entire quantity; neither m nor v can be changed. This is because translational inertia mass which cannot be altered except under very special circumstances.

Angular momentum is also conserved but it differs from linear momentum in that its state can be transformed. By this is meant that for a given momentum Z, made up of, $I_1 \omega_1$ (state 1) or $I_2 \omega_2$ (state 2), where $I_1 \neq I_2$ and $\omega_1 \neq \omega_2$. This is possible because the moment of inertia I, can be changed by changing its shape (i.e. moving arms 94 and 96).

If the other components of the transmission are not able to change their moment of inertia (elements such as gears or shafts), then a change of momentum state in the control path which results in a different angular velocity can only result in a momentum exchange between the other two elements or a change in the rate of torque conversion through the system. Since this is a rigid body system this must be associated with a change in the input/output speeds or the transmission ratio.

The torque conversion occurs by way of a kinetic energy change in the system. Since $\int I\omega$=the kinetic energy and $W = _\tau \theta$ Where w is work, and $_\tau$is torque and $\theta$ is angular displacement.

If energy is not less than W is conversed and $\theta$ changed because the angular velocity of some parts of the system is changed, then $\tau$ is changed. This is the process of torque conversion.

The orbital spur transmission 60 which is included in the embodiment of FIG. 2 provides a number of significant advantages to the transmission. The orbital spur transmission 60 provides a planet system which has all of the gears provided with external teeth and is not necessary to provide a gear with internal teeth. Furthermore, the inclusion of the idler gear 70 results in the output gear 56 and control gear 74 rotating in the same direction. If the planet gear 66 or 67 was directly connected to the control gear 74 the control gear 74 would necessarily rotate in the opposite direction. However, since rotation is transmitted to the control gear 74 via the idler gear 70 the direction of rotation of the gear 74 is effectively reversed so that it does rotate in the same direction as the output gear 56.

Furthermore, since the planet gears 69 and 67 are coupled to the gear 74 by the idler gear the transmission 60 can be designed with any ratio which is required because the number of teeth on the gears 66, 67, 74 and 56 can be selected as desired. If the planet gears 66 and 67 are connected directly to the gear 74 the tooth ratio of the gear 74 relative to the other gears is limited therefore limiting the ratio which the planet system would otherwise be able to provide.

Thus, whilst it is usual for planet systems to have a ratio in the order of 4:5:1 the orbital planet spur 60 of this embodiment can provide a ratio as low as 1000:1.

Figure 11:
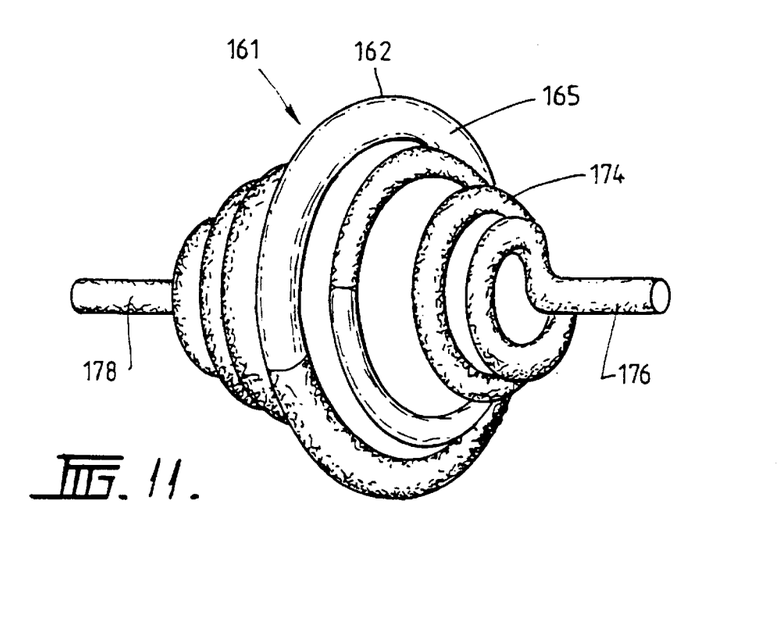
FIG. 11 is a view showing an alternative arrangement which can be used in the second embodiment of the invention.

FIG. 11 shows a further arrangement which can be used in the second embodiment of the invention in which the change in the moment of inertia of the system is altered by a method other than moveable arms as in the case of FIGS. 3 to 9. In this arrangement the spool is effectively replaced by a spiral tube system 161 which has a central coil 162 which is radially outermost. Hydraulic fluid 174 is located in the coil adjacent ends 176 and 178 of the spiral system 161 and mercury 165 is located intermediate in the vicinity of the radially outermost coil 162. In order to change the moment of inertia of the hydraulic fluid 174 is pumped through the spool 161 to move the mercury from the radially outermost coil 162 shown in FIG. 11 to one of the other coils which are less radially outward thereby bringing the most heaviest part of the system radially inwardly to thereby change the moment of inertia. This system allows control of the moment of inertia by pumping fluid into and out of the coil system 161 rather than reliance only on centrifugal force as in the previous embodiment.

Figure 12:
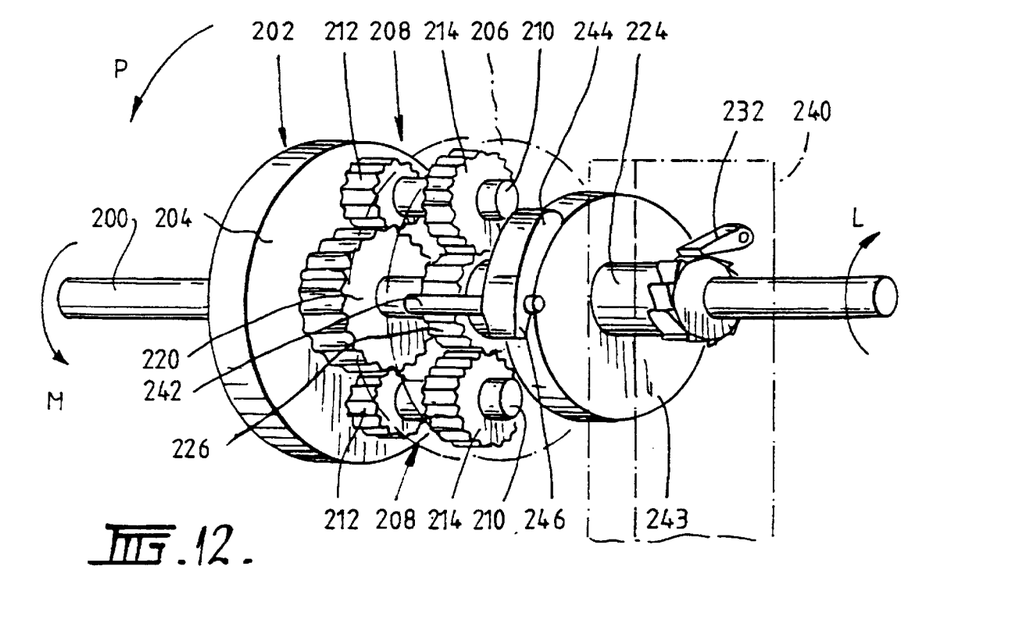
FIG. 12 is a cross-sectional view of a third embodiment of the invention.

FIG. 12 shows a third embodiment of the invention which is somewhat similar to the embodiment of FIG. 1 which also works on a momentum conversion process as in the embodiment of FIG. 1.

In FIG. 12 an input shaft 200 is coupled to a planet cage 202. The planet cage 202 has plates 204 and 206 which are connected by a cylindrical outer casing, struts (not shown) or the like so that the plates 204 and 206 rotate as a unit. A plurality of spur clusters 208 are carried by the cage 202. Each spur cluster 208 is mounted on a shaft 210 journaled between the plates 204 and 206. Each cluster 208 has a first planet gear 212 and a second planet gear 214.

An output gear 220 is mounted on an output shaft 222. A hollow control shaft 224 is mounted for rotation relative to the output shaft 222 and has a control gear 226 at one end. As clearly show in FIG. 12 the output gear 220 is in mesh with the first planet gears 212 and the control gear 226 is in mesh with the second planet gears 214.

The control shaft 224 has a ratchet ring 230 at its end remote from the control gear 226 and a ratchet pawl 232 which is pivotally coupled to casing or stand 240 is engagable with a tooth 231 of the ratchet ring 230. The control shaft 224 also carries a fly wheel 240.

The plate 206 of the cage 202 has two pins 242 projecting outwardly toward the fly wheel 240. In FIG. 12 only one of the pins can be seen. Each pin 242 carries a load arm 244 which is pivotally mounted on the respective pin 242. The load arm 244 has a brake portion 246 at one end.

When input rotary power is supplied to the input shaft 200 the cage 202 and rotated so that the spur clusters 208 orbit with the planet cage 202. Rotation of the orbiting clusters 208 is transmitted to the output gear 220 and also to the control gear 226 so that the output gear 220 and control gear 226 rotate in the opposite direction to the input shaft 200. For example, if the input shaft 200 is rotated in the direction of arrow M in FIG. 12 the output gear 220 and control gear 226 are rotated in the direction of arrow L in FIG. 12.

The planet cage 202 and the clusters 208, output gear 220 and control gear 226 are generally the same as the spur planet cluster described with reference to FIGS. 3 to 6 except that the idler gear is not included thereby resulting in the control gear 226 rotating in the opposite direction to the input shaft rather than the same direction as the input shaft as was the case in FIG. 3.

The drive ratio set by the transmission of FIG. 12 is initially set so that the drive ratio is the same as that described with reference to FIG. 3 where A is control gear 226, B is planet gear 214, C is planet gear 212 and D is output gear 220. As previously described the gear ratio of such a system without the inclusion of the idler gear is within the relatively narrow range of, for example, between 4:1 and 5:1.

The embodiment of FIG. 12 provides a fixed reduction ratio low gear, rather than neutral and has application in small simple transmission systems.

As the planet cage 202 rotates as described above, the tendency of the control gear 226 to rotate in the opposite direction will mean that the control shaft 224 also rotates in the opposite direction so that one of the teeth 231 on the ratchet ring 230 engage the pawl 232 to prevent further rotation of the control shaft 224 and control gear 226 in the direction of arrow L. This will place the transmission into low gear of between 4:1 and 5:1.

As the input rotary power to the input shaft 200 increases and the speed of rotation of the planet cage 202 increases the load arms 244 will tend to swing outwardly about pivot pins 242 in the direction of arrow P (in the case of the arm 244 shown in FIG. 12). This will bring the brake portion 246 into to engagement with the peripheral surf ace of the fly wheel 240. Engagement of the brake 246 with the fly wheel 240 will tend to rotate the fly wheel 240 in a direction opposite arrow L (i.e. in the same direction as the cage 202 direction M) so that the control gear 226 is driven in the same direction. The ratchet ring 230 simply free wheels relative to the pawls 232 when the control shaft 224 rotates in this direction. This will cause the drive ratio of the transmission to move towards the ratio of 1:1. The faster the planet cage 202 rotates the more the braking effect caused by the outward movement of the arm 244 a nd the less slippage between the brake 246 and the fly wheel 240 thereby causing the flywheel 240 to increase in speed. The increase in speed is supplied to the control gear 226 so that the drive ratio continues to move towards a 1:1 drive ratio.

At maximum speed of the cage 202 and input shaft 200 the brake 246 is intended to grip the fly wheel 240 so that there is no slippage and affectively lock the fly wheel 240 to the cage 202. This in turn locks the control gear 226 to the cage 202 so that the output ratio is 1:1.

If the rotational speed of the input shaft 200 decreases the arms 244 will move inwardly due to the decrease in centrifugal force thereby enabling reduced brake pressure form the brake 246 onto the fly wheel 240 and some slippage of the fly wheel 240. Thus, the gear ratio will decrease to the lower gear ratio and the relative movement of the fly wheel 240 affectively backward relative to the cage 202 will cause one of the teeth 231 to engage with the pawl 232 so as to stop the control shaft 224 and return the transmission to the low gear ratio of between 4:1 and 5:1.

Once again in this embodiment of the invention the change in momentum caused by the movement of the arms 244 outwardly results in the control of the speed of the control gear 226 to, in turn, change the drive ratio of the transmission between the low gear up to a gear ratio of 1:1 dependent on the speed of rotation of the shaft 200.

Although the planetary orbital spur gear system and a type similar to that shown in FIG. 3, is used in FIG. 12, and FIG. 12 could also use the orbital gear system of FIG. 1 with the arms 244 carried by the cage 16 of FIG. 1 and the fly wheel 240 replacing the fly wheel 22 of FIG. 1 together with its associated operating mechanism.

The claims defining the invention are as follows:

1. A planetary spur gear system for setting the drive ratio of a transmission, including;

a first sun gear having external teeth and forming an output gear for supply of rotary power;

a second sun gear having external teeth;

a planet cage;

a planet gear system supported in the planet cage and having a first planet gear, and a second planet gear pixel to the first planet gear;

a transfer gear in mesh with the second planet gear, the first planet gear being in mesh with one of the first sun gear or the second sun gear and the transfer gear being in mesh with the other of the first sun gear or the second sun gear;

one of the second sun gear and the planet cage forming a control that sets the drive ratio of the transmission, and the other of the second sun gear and the planet cage forming an input to the transmission, the first sun gear forming an output from the transmission; and control means for controlling the rotation of the second sun gear or the planet cage to thereby set the drive ratio of the transmission.

2. The system according to claim 1 wherein the planet cage comprises an input for input of rotary power into the transmission.

3. The system according to claim 1 wherein the second sun gear is controlled to set the drive ratio of the transmission.

4. The system according to claim 2 wherein the second sun gear is controlled to set the drive ratio of the transmission.

* * * * *